US005422528A

United States Patent [19]

Prahl

[11] Patent Number: 5,422,528

[45] Date of Patent: Jun. 6, 1995

[54] DRUM COMMUTATOR FOR ELECTRICAL MACHINES

[75] Inventor: Detlef Prahl, Buehl, Germany

[73] Assignee: Robert Bosch GmbH, Stuttgart, Germany

[21] Appl. No.: 164,350

[22] Filed: Dec. 9, 1993

[30] Foreign Application Priority Data

Dec. 9, 1992 [DE] Germany ........................ 42 41 407.5

[51] Int. Cl.$^6$ ...................... H02K 15/00; H01R 39/16; H01R 43/06

[52] U.S. Cl. ...................................... 310/235; 310/42; 29/597

[58] Field of Search ................... 310/42, 43, 233, 235, 310/236; 29/597

[56] References Cited

U.S. PATENT DOCUMENTS

| | | | |
|---|---|---|---|
| 435,503 | 9/1890 | Lieb | 310/236 |
| 2,645,733 | 7/1953 | Marsal | 310/235 |
| 3,473,063 | 10/1969 | Forste et al. | 310/234 |
| 4,283,841 | 8/1981 | Kamiyama | 310/236 |
| 4,408,140 | 10/1983 | Thompson | 310/235 |
| 4,726,113 | 2/1988 | Shibata et al. | 310/236 |
| 5,157,299 | 10/1992 | Geriach | 310/235 |
| 5,175,463 | 12/1992 | Farago et al. | 310/237 |
| 5,225,426 | 10/1993 | Farago et al. | 310/237 |
| 5,245,240 | 9/1993 | Takasaki | 310/235 |

FOREIGN PATENT DOCUMENTS

| | | | |
|---|---|---|---|
| 8907045 | 12/1989 | Germany . | |
| 3-40738 | 2/1991 | Japan | 310/235 |

*Primary Examiner*—Steven L. Stephan
*Assistant Examiner*—Clayton E. LaBalle
*Attorney, Agent, or Firm*—Michael J. Striker

[57] ABSTRACT

A drum commutator for electrical machines has an isolating material drum and a plurality of commutator plates composed of an electrically conductive material, the commutator plates being mounted on a periphery of the isolating material drum near one another and electrically separated from one another by axial slots, each of the commutator plates being provided with a surface coating composed of carbon material and with a connecting lug for an armature winding of an electrical machine, each of the commutator plates having at least one depression at its lower side placed on the isolating material drum and being also provided with a radial passage which opens in the depression and has a reduced size relative to the depression, the carbon material of the surface coating filling the passage and the depression as a one-piece structure.

12 Claims, 2 Drawing Sheets

DRUM COMMUTATOR FOR ELECTRICAL MACHINES

BACKGROUND OF THE INVENTION

The present invention relates to a drum commutator for electrical machines.

More particularly, it relates to a drum commutator which has an oscillating material drum and a plurality of commutator plates extending from its periphery and provided with a surface coating of carbon material and with a connecting lug for an armature winding of the electrical machine.

Drum commutators of the above mentioned general type are known in the art. They are utilized in wet electric motors in feed aggregates for aggressive liquids, for example in fuel pumps of motor vehicles. The surface coating of carbon material, for example graphite, which is resistant to the aggressive medium to be fed, protects the metallic surface of the commutator plates which are usually composed of copper. Otherwise, they would strongly oxidize and corrode during a current transfer with the resulting high and non-uniform voltage drop at the commutator.

Drum commutators of this type are disclosed for example in the German document DE-GM 89 07 045, page 2. Here the surface coating is formed as a graphite ring which is surface-treated on its inner surface and then soldered to the drum commutator. Then the graphite ring is slotted or in other words segmented so that a graphite coating is produced for the individual commutator plates. In this known plan commutator disclosed in this reference the commutator body composed of a synthetic plastic material is provided with a copper coating in which the commutator segments are formed. The plan surface of the commutator segments is provided correspondingly with a carbon coating which extends via form-locking holding means through the commutator plates into a corresponding recess in the commutator body and is anchored there.

SUMMARY OF THE INVENTION

Accordingly, it is an object of the present invention to provide a drum commutator, which avoids the disadvantages of the prior art.

In keeping with these objects and with others which will become apparent hereinafter, one feature of the present invention resides, briefly stated, in a drum commutator in which each commutator plate has at least one depression in its lower side placed on the isolating material drum, and at least one radial passage or opening which opens into the depression and has a size reduced relative to the size of the depression or transverse groove, and the carbon material of the surface coating fills with one piece the passage and the depression.

When the drum commutator is designed in accordance with the present invention with the depressions and passages in the drum commutator plates with filling of the same with the carbon material of the outer coating, an intensive form-locking of the surface coating against loosening of the commutator segments in all directions is provided. Thereby the commutator is less susceptible to voltages due to temperature changes, expansion stresses and similar influences, the long term properties of the drum commutator are substantially improved and the commutator transitional resistance is lowered.

In accordance with another advantageous feature of the present invention, the commutator plates with the surface coating are located with their free end sides facing away of the connecting lugs against a ring flange which is of one piece with the isolating material drum. The ring flange extends radially beyond the drum periphery and projects to the upper edge of the surface coating of the commutator plates. Due to the ring flange which is produced together with the isolating material drum from the same press mass, a protection of the surface coating against mechanical damages is obtained.

In accordance with the preferable embodiment of the invention, the end sides of the surface coating of the commutator plates which face away from the ring flange abut flush against a ring collar abutting on the commutator plates and composed from the isolating material. The ring collar is connected through recesses in the commutator plates one piece with the isolating material drum. The ring collar is also made from the press mass during pressing of the isolating material drum. In connection with the ring flange, the carbon material of the surface coating of the commutator is surrounded at the end side by the press mass and thereby is protected in an optimal manner against mechanical damages. Moreover, due to the ring collar of press mass which is displaced relative to the carbon material and has low heat conductive properties, the heat conveyance from the connecting lugs to the surface coating is substantially reduced. Thereby the carbon material is protected from excessive heating during welding of the armature winding on the connecting lugs. Therefore also a standard welding process can be utilized without damaging the carbon compound during welding. The use of expensive welding processes with low welding temperatures, for example ultrasound welding, can therefore be avoided.

In accordance with a preferable embodiment of the invention, a claw projects inwardly at the lower side of each commutator plate and is anchored in the cylindrical wall of the isolating material sleeve. The claws are preferably freely stamped at each side of the angular collar from the commutator plates and bent inwardly. During pressing of the isolating material sleeve, the claws are form-lockingly-received in the press mass and therefore provide an additional securing of the commutator plates against radial and axial forces.

In accordance with a further advantageous embodiment of the invention, the drum commutator is produced so that first a metal band composed for example of copper is provided by punching with two grooves which extend on the wall lower side in parallel distance from one another, and openings are formed in the metal band at a distance corresponding to the commutator plate width and open in both grooves. In some cases only the claws are stamped and bent from the metal band. The metal band is brought to the cylindrical shape and inserted into a press mold in which then the carbon material is pressed in. After hardening of the carbon material, an intensive form locking with undercut is produced due to the filling of the grooves and openings. In a further press mold the metal band with the hardened carbon material is embedded into the press mass of the isolating material sleeve. Thereby due to the suitable shape of the press mold, simultaneously the ring flange and the ring web are formed on both end sides of the surface coating. Then the band webs which are produced in the metal band by the recesses are bent to connecting lugs in a hook-shaped manner by substantially less than 180° in direction of the surface of the commutator plates, and the metal band with the surface coating and the ring collar is cut axially with the separating lines extending transverse to the grooves and symmetrically to two neighboring openings in the grooves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
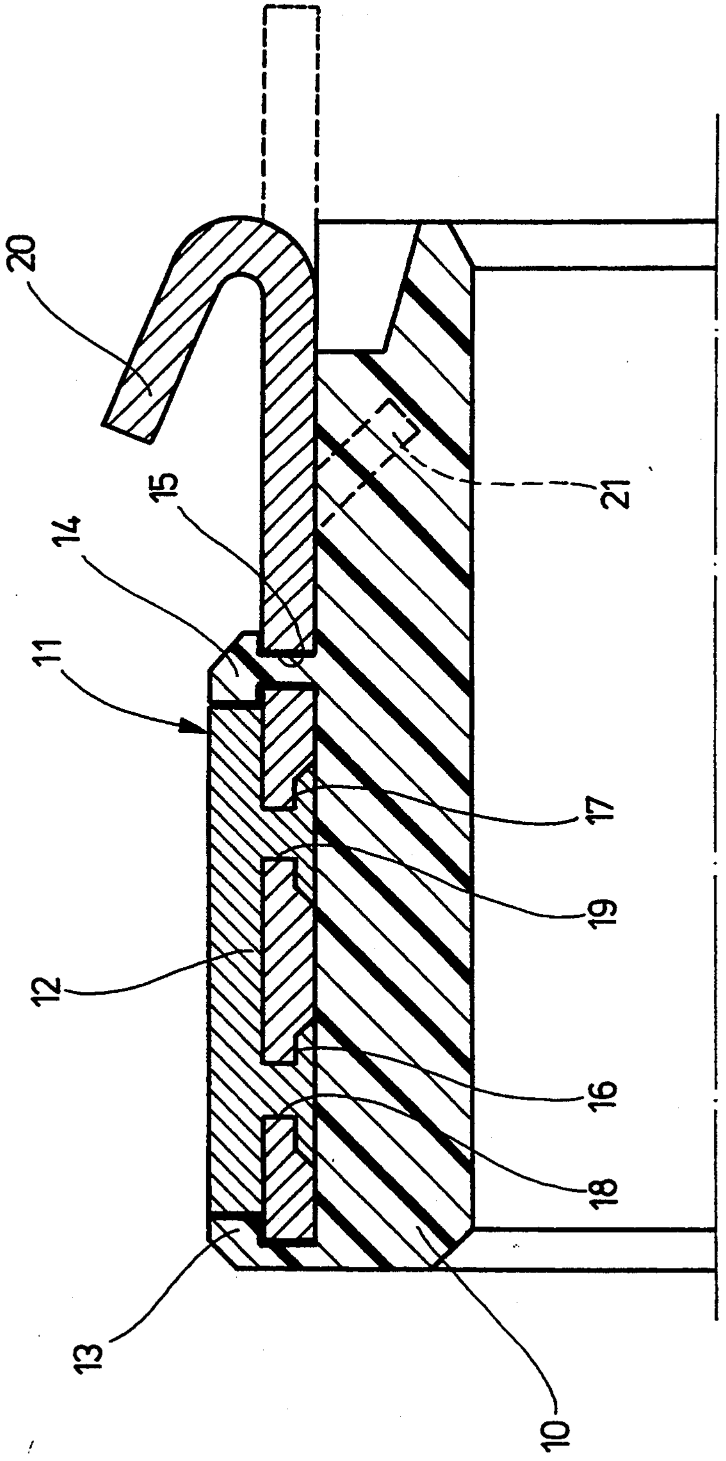
FIG. 1 is a view showing a longitudinal section of a drum commutator for an electrical machine in accordance with the present invention.

A drum commutator for an electrical machine shown in a longitudinal section in FIG. 1 has an isolating material drum 10 which is fixedly mounted on a drive shaft of an electric motor. A plurality of commutator plates composed of an electrically conductive metal, for example copper, are mounted on the periphery of the isolating material drum 10. They are arranged near one another and electrically separated from one another by axial slots. The commutator plates 11 are provided with a surface coating 12 composed of a carbon material, for example graphite, in the abutment region of the commutator brushes. The surface coating 12 is embedded at the end side between a ring flange 13 and segments assembled to form a ring collar 14.

The ring flange 13 is formed of one piece with the isolating material drum 10 and extends radially over the drum periphery to the upper edge of the coating 12. The segments of the ring collar 14 are connected through recesses 15 in the commutator plates 11 which are formed as openings, also of one piece with the isolating material drum 10. The segments are assembled over the periphery of the drum commutator to form a closed ring collar 14 which is interrupted only through axial slots between the commutator plates 11.

For obtaining an intensive form-locking connection between the commutator plates 11 and their surface coating 12 of carbon material, each commutator plate 11 on its lower side is provided with two depressions in form of a transverse groove 16 and 17 extending over the whole plate width, and with two radial passages formed as openings 18 and 19 which open into one of the grooves 16 and 17. The carbon material of the surface coating 12 fills the openings 18 and 19 and the transverse grooves 16 and 17 so as to be of one piece, so that the surface coating 12 is mounted by a so-called undercut on the outer surface of the metal commutator plates 11. Each commutator plate 11 is provided with a connecting lug 20 at its end which faces away of the ring flange 13 of the isolating material drum 10. The connecting lug 20 is bent as a one-piece member from the commutator lug 11. The armature winding of the electric motor is soldered or welded on the connecting lugs 20.

As shown in FIG. 1 in dashed lines, a claw 21 can project inwardly on the lower side of each commutator plate 11 and can be embedded in the cylindrical wall of the isolating material drum 10. Thereby an additional form-locking connection of the commutator plates 11 in the isolating material drum 10 is provided. The claw 21 is preferably punched out from the commutator plate 11 in the region between the ring collar 14 and the connecting lug 20, and bent inwardly.

Figure 2:
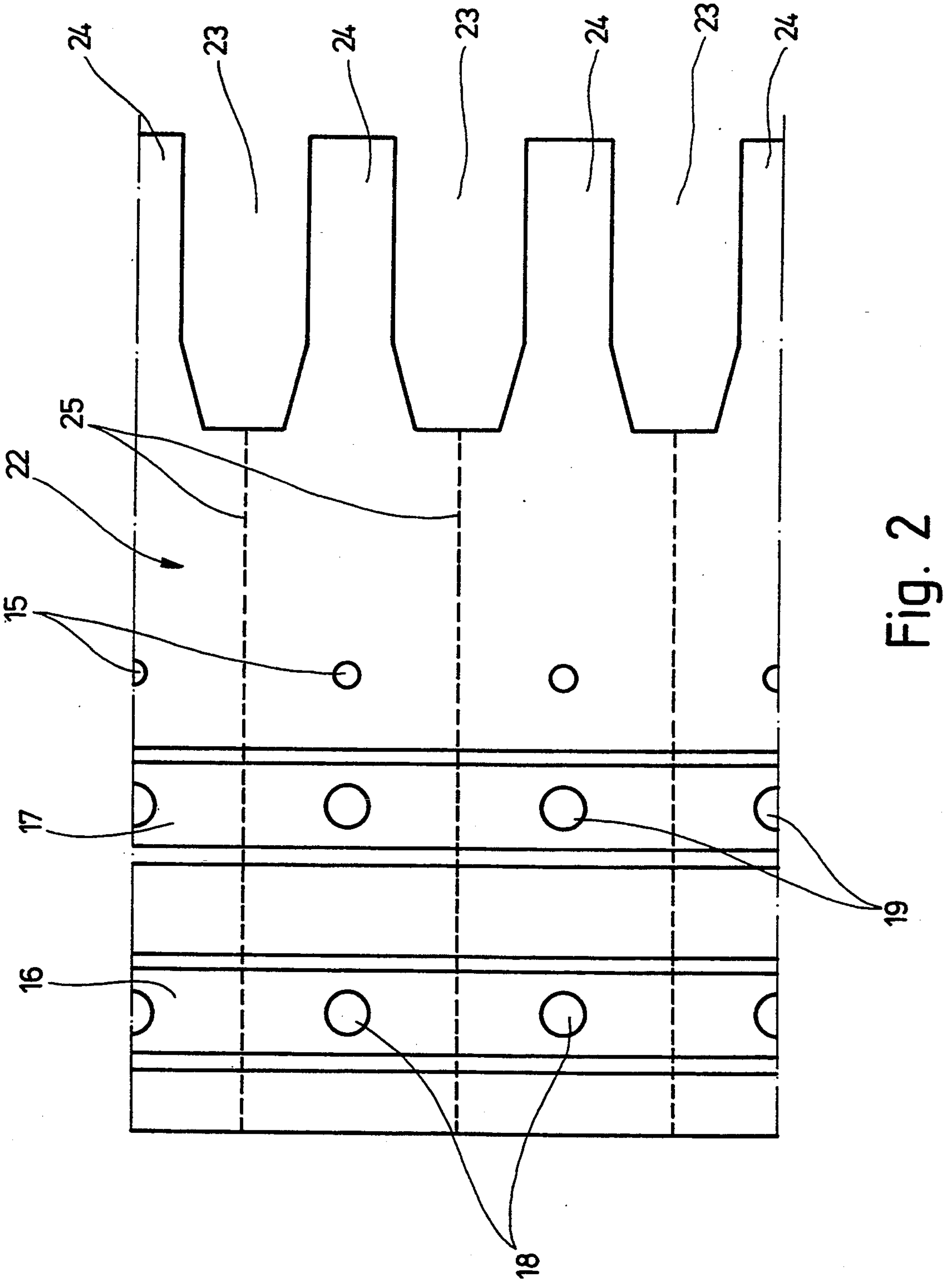
FIG. 2 is a sectioned lower view of a prefabricated metal band for producing the drum commutator of FIG. 1 in accordance with the present invention.

The above described drum commutator is produced in the following manner:

A metal band 22 composed of copper and shown in portions in FIG. 2 is provided on its lower side with two parallel, longitudinally extending grooves 16 and 17 which form transverse grooves 16 and 17 in the commutator plates 11. The grooves can be for example impressed by punching. Openings 18 on the one hand and openings 19 on the other hand are provided in each of the grooves 16 and 17, and a distance of the openings 18 from one another and openings 19 from one another is similar to the desired commutator plate width. Further openings 18 are provided at a distance from the groove 17 in alignment with the openings 18, 19. They form the above described openings 14 for connecting the ring collar 15 with the isolating material drum 10. Recesses 23 are punched out at the end side of the metal band 22 which is located at the greatest distance from the grooves 16, 17. They are formed so that a band web 24 remains between them and has an axis of symmetry which is located in the alignment line of the openings 18, 19 and 15. Later on, the connecting lugs 20 are formed from the bent webs 24. The recesses 23 are all identical and mirror-symmetrical relative to their central axis.

The metal band 22 produced by the above described punching and molding is shown partially on the bottom view of FIG. 2. It is brought to a cylindrical shape and inserted into a press mold. The carbon material is pressed into the press mold, so that both the surface coating 12 is formed in the desired shape and the openings 18, 19 and the grooves 16, 17 are filled with the carbon material. After hardening the carbon material, the form locking connection is produced between the surface coating 12 and the metal band 22. In a further press mold, as conventional, the coated metal band 22 is embedded into the isolating material drum 10, and in some cases the claws 21 are bent inwardly from the metal band 22 before this. In the press mold, the press mass forms both the isolating material drum 10 and the ring flange 13 as well as the ring collar 14 through the openings 15. Therefore the hardened carbon material is embedded at the end side in the press mass from which the isolating material drum 10 is produced. Now the band webs 24 are bent somewhat less than 180° on the surface of the metal band 22 as shown in FIG. 1. The commutator plates 11 are produced by slot-like separation of the surface coating 12, the metal band 22, and the ring collar 14. The separating lines shown in dash lines in FIG. 2 or the slots 25 extend exactly centrally between two openings 18 in the grooves 16 and two openings 19 in the grooves 17 and centrally between two neighboring openings 15. Thereby the individual commutator plates 11 are electrically separated from one another, the grooves 16, 17 are subdivided into the transverse grooves 16, 17 shown in FIG. 1, and extending over a commutator plate width, and the ring collar 14 is subdivided into the above described individual ring collar segments. After placing the drum commutator on the rotor shaft of an electrical machine, the armature winding of the electrical machine can be connected with the connecting lugs 20, and therefore the mechanical and electrical connection is produced by conventional welding.

It will be understood that each of the elements described above, or two or more together, may also find a useful application in other types of constructions differing from the types described above.

While the invention has been illustrated and described as embodied in a drum commutator for electrical machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drum commutator for electrical machines, comprising an isolating material drum; and a plurality of commutator plates composed of an electrically conductive material, said commutator plates being mounted on a periphery of said isolating material drum near one another and electrically separated from one another by axial slots, each of said commutator plates being provided with a surface coating composed of carbon material and with a connecting lug for an armature winding of an electrical machine, each of said commutator plates having at least one depression provided at its lower side placed on said isolating material drum and formed as a groove extending over a whole width of each of said commutator plates, each of said commutator plates being also provided with a radial passage which opens in said depression and has a reduced size relative to said depression, said carbon material of said surface coating filling said passage and said depression as a one-piece structure.

2. A drum commutator as defined in claim 1; and further comprising a ring flange which is formed of one piece with said isolating material drum, said ring flange projecting radially over a periphery of said drum and extending to an upper edge of said surface coating of said commutator plates, said commutator plates with said surface coating having end sides facing away from said connecting lugs and abutting against said ring flange.

3. A drum commutator as defined in claim 2; and further comprising a ring collar composed of an isolating material and abutting against said commutator plates, said surface coating of said commutator plates having end sides which face away of said ring flange and abut flush against said annular collar.

4. A drum commutator as defined in claim 1, wherein said isolating material drum has a cylindrical wall, said commutator plate being provided at a lower side with an inwardly projecting claw which is anchored in said cylindrical wall of said isolating material drum.

5. A drum commutator as defined in claim 4; and further comprising a ring collar composed of isolating material and abutting against said commutator plates, said claws being freely punched at each side of said ring collar from said commutator plates and being bent inwardly.

6. A drum commutator for electrical machines, comprising an isolating material drum; and a plurality of commutator plates composed of an electrically conductive material, said commutator plates being mounted on a periphery of said isolating material drum near one another and electrically separated from one another by axial slots, each of said commutator plates being provided with a surface coating composed of carbon material and with a connecting lug for an armature winding of an electrical machine, each of said commutator plates having at least one depression at its lower side placed on said isolating material drum being also provided with a radial passage which opens in said depression and has a reduced size relative to said depression, said carbon material of said surface coating filling said passage and said depression as a one-piece structure, said commutator plates being composed of a metal band having two grooves extending parallel to one another at a lower side and forming said depressions and also having two openings which open in said grooves and arranged at a distance corresponding to a commutator plate width so as to form said passages and which is formed to a cylindrical shape and provided in a press mold with a coating of carbon material by pressing into the press mold, so that after pressing the isolating material drum with a ring flange as a ring collar said surface coating and said ring collar are formed by axial slots in the metal band.

7. A drum commutator as defined in claim 6, wherein said slots extend transverse to said grooves symmetrically to two openings which are adjacent to the same groove.

8. A drum commutator as defined in claim 7, wherein said metal band has a plurality of identical recesses which extend parallel to said grooves from an end side, arranged equidistantly and mirror-symmetrical relative to one of said slots, and band webs remaining between said recesses are bent as the connecting lugs in a hook-shaped manner substantially less than 180° in direction of a surface of said commutator plates.

9. A method of producing a drum commutator for electrical machines, comprising the step of providing a metal band so that commutator plates are composed of a metal band having two grooves extending parallel to one another at a lower side and forming depressions and also having two openings which open in said grooves and arranged at a distance corresponding to a commutator plate width so as to form passages and which is formed to a cylindrical shape and provided in a press mold with a coating of carbon material by pressing into the press mold, so that after pressing the isolating material drum with a ring flange as a ring collar said surface coating and said ring collar are formed by axial slots in the metal band.

10. A method as defined in claim 9, wherein said slots extend transverse to said grooves symmetrically to two openings which are adjacent to the same groove.

11. A method as defined in claim 10, wherein said metal band has a plurality of identical recesses which extend parallel to said grooves from an end side, arranged equidistantly and mirror-symmetrical relative to one of said slots, and band webs remaining between said recesses are bent as the connecting lugs in a hook-shaped manner substantially less than 180° in direction of a surface of said commutator plates.

12. A drum commutator for electrical machines, comprising an isolating material drum; and a plurality of commutator plates composed of an electrically conductive material, said commutator plates being mounted on a periphery of said isolating material drum near one another and electrically separated from one another by axial slots, each of said commutator plates being provided with a surface coating composed of carbon material and with a connecting lug for an armature winding of an electrical machine, each of said commutator plates having at least one depression at its lower side placed on said isolating material drum being also provided with a radial passage which opens in said depression and has a reduced size relative to said depression, said carbon material of said surface coating filling said passage and said depression as a one-piece structure, a ring flange which is formed of one piece with said isolating material drum, said ring flange projecting radially over a periphery of said drum and extending to an upper edge of said surface coating of said commutator plates, said commutator plates with said surface coating having end sides facing away from said connecting lugs and abutting against said ring flange; a ring collar composed of an isolating material and abutting against said commutator plates, said surface coating of said commutator plates having end sides which face away of said ring flange and abut flush against said annular collar, said commutator plates having openings, said ring collar being connected through said openings of one piece with said isolating material drum.

* * * * *